United States Patent
Zhan et al.

(10) Patent No.: US 11,866,372 B2
(45) Date of Patent: Jan. 9, 2024

(54) BN) DRILLING TOOLS MADE OF WURTZITE BORON NITRIDE (W-BN)

(71) Applicants: Saudi Arabian Oil Company, Dhahran (SA); Chengdu Dongwei Technology Co., LTD, Chengdu (CN)

(72) Inventors: Guodong Zhan, Dhahran (SA); Timothy E. Moellendick, Dhahran (SA); Bodong Li, Dhahran (SA); Duanwei He, Chengdu (CN)

(73) Assignees: Saudi Arabian Oil Company, Dhahran (SA); Chengdu Dongwei Technology Co., LTD, Chengdu (CN)

( * ) Notice: Subject to any disclaimer, the term of this patent is extended or adjusted under 35 U.S.C. 154(b) by 85 days.

(21) Appl. No.: 17/316,187

(22) Filed: May 10, 2021

(65) Prior Publication Data

US 2021/0371345 A1 Dec. 2, 2021

Related U.S. Application Data

(60) Provisional application No. 63/031,077, filed on May 28, 2020.

(51) Int. Cl.
*C04B 35/5831* (2006.01)
*C04B 35/645* (2006.01)
*B24B 19/04* (2006.01)

(52) U.S. Cl.
CPC .......... *C04B 35/5831* (2013.01); *B24B 19/04* (2013.01); *C04B 35/645* (2013.01);
(Continued)

(58) Field of Classification Search
None
See application file for complete search history.

(56) References Cited

U.S. PATENT DOCUMENTS

| 3,632,369 A | 1/1972 | Hahn et al. |
| 4,017,480 A | 4/1977 | Baum |

(Continued)

FOREIGN PATENT DOCUMENTS

| AU | 2005286168 | 3/2006 |
| CN | 104612583 | 5/2015 |

(Continued)

OTHER PUBLICATIONS

GCC Examination Report in GCC Appln. No. GC 2020-40173, dated Sep. 26, 2021, 5 pages.

(Continued)

*Primary Examiner* — James A Fiorito
*Assistant Examiner* — Ross J Christie
(74) *Attorney, Agent, or Firm* — Fish & Richardson P.C.

(57) ABSTRACT

Systems and methods include a computer-implemented method can be used to make drilling tools from new wurtzite boron nitride (w-BN) superhard material. An ultra-high-pressure, high-temperature operation is performed on pure w-BN powder to synthesize w-BN and cubic boron nitride (c-BN) compact having a first size greater than particles of the pure w-BN powder. The ultra-high-pressure, high-temperature operation includes pressurizing the w-BN powder to a pressure of approximately 20 Gigapascal, heating the w-BN powder at a heating rate of 100° C./minute and cooling the w-BN powder at a cooling rate of 50° C./minute. The compact is cut to a second size smaller than the first size using laser cutting tools. The cut compact is bonded metallurgically, mechanically, or both metallurgically and mechanically onto a tool substrate to form the drilling tool.

7 Claims, 12 Drawing Sheets

(52) U.S. Cl.
CPC .. *C04B 2235/386* (2013.01); *C04B 2235/612* (2013.01); *C04B 2235/6562* (2013.01); *C04B 2235/6565* (2013.01); *C04B 2235/762* (2013.01); *C04B 2235/767* (2013.01)

(56) References Cited

U.S. PATENT DOCUMENTS

| | | | |
|---|---|---|---|
| 4,129,437 A * | 12/1978 | Taguchi | C22B 1/2406 75/768 |
| 4,181,752 A | 1/1980 | Martens et al. | |
| 4,255,165 A | 3/1981 | Dennis et al. | |
| 4,288,248 A | 9/1981 | Bovenkerk et al. | |
| 4,334,928 A | 6/1982 | Hara | |
| 4,343,651 A | 8/1982 | Yazu et al. | |
| 4,394,170 A | 7/1983 | Sawaoka et al. | |
| 4,525,178 A | 6/1985 | Hall | |
| 4,664,705 A | 5/1987 | Horton et al. | |
| 4,859,531 A * | 8/1989 | Tsuji | C04B 37/026 228/262.71 |
| 4,943,488 A | 7/1990 | Sung et al. | |
| 4,945,073 A | 7/1990 | Dubensky et al. | |
| 5,000,273 A | 3/1991 | Horton et al. | |
| 5,030,276 A | 7/1991 | Sung et al. | |
| 5,037,704 A | 8/1991 | Nakai et al. | |
| 5,096,465 A | 3/1992 | Chen et al. | |
| 5,199,832 A | 4/1993 | Meskin et al. | |
| 5,326,380 A | 7/1994 | Yao et al. | |
| 5,337,844 A | 8/1994 | Tibbitts | |
| 5,370,195 A | 12/1994 | Keshavan et al. | |
| 5,387,776 A * | 2/1995 | Preiser | B23K 26/40 219/121.72 |
| 5,523,158 A | 6/1996 | Kapoor et al. | |
| 5,603,070 A | 2/1997 | Cerutti et al. | |
| 5,833,021 A | 11/1998 | Mensa-Wilmot et al. | |
| 5,848,348 A | 12/1998 | Dennis | |
| 5,889,219 A | 3/1999 | Moriguchi et al. | |
| 6,008,153 A | 12/1999 | Kukino et al. | |
| 6,073,518 A | 6/2000 | Chow et al. | |
| 6,096,436 A | 8/2000 | Inspektor | |
| 6,209,420 B1 | 4/2001 | Butcher et al. | |
| 6,469,278 B1 | 10/2002 | Boyce | |
| 6,623,850 B2 | 9/2003 | Kukino et al. | |
| 7,322,776 B2 | 1/2008 | Webb et al. | |
| 7,441,610 B2 | 10/2008 | Belnap et al. | |
| 7,645,513 B2 | 1/2010 | Bello et al. | |
| 7,647,992 B2 | 1/2010 | Fang et al. | |
| 8,071,173 B1 | 12/2011 | Sani | |
| 8,130,903 B2 * | 3/2012 | Corbett | G01T 1/00 378/45 |
| 8,512,865 B2 | 8/2013 | DiGiovanni | |
| 8,734,552 B1 | 5/2014 | Vail et al. | |
| 8,931,582 B2 | 1/2015 | Cooley et al. | |
| 8,960,337 B2 | 2/2015 | Hall et al. | |
| 9,097,074 B2 | 8/2015 | Shen et al. | |
| 9,254,554 B1 | 2/2016 | Bertagnolli | |
| 9,435,159 B2 | 9/2016 | Scott | |
| 9,482,056 B2 | 11/2016 | Eyre et al. | |
| 9,683,410 B2 | 6/2017 | Zhang et al. | |
| 10,017,998 B2 | 7/2018 | Bilen et al. | |
| 10,118,223 B2 | 11/2018 | Eason | |
| 10,179,390 B2 | 1/2019 | Mukhopadhyay et al. | |
| 10,612,311 B2 | 4/2020 | Duerholt | |
| 10,704,334 B2 | 7/2020 | Jiang | |
| 10,946,500 B2 | 3/2021 | Chapman et al. | |
| 2003/0052098 A1 * | 3/2003 | Kim | C03B 33/102 225/93.5 |
| 2008/0223623 A1 | 9/2008 | Keshavan et al. | |
| 2008/0312892 A1 | 12/2008 | Heggemann | |
| 2010/0276209 A1 | 11/2010 | Yong et al. | |
| 2011/0031026 A1 | 2/2011 | Oxford et al. | |
| 2011/0083908 A1 | 4/2011 | Shen et al. | |
| 2011/0271603 A1 | 11/2011 | Voronin et al. | |
| 2012/0097457 A1 | 4/2012 | Setlur et al. | |
| 2013/0056284 A1 | 3/2013 | Atkins et al. | |
| 2013/0067824 A1 | 3/2013 | King et al. | |
| 2013/0277121 A1 | 10/2013 | Stevens et al. | |
| 2013/0320598 A1 | 12/2013 | Atkins et al. | |
| 2014/0110180 A1 | 4/2014 | Yu et al. | |
| 2014/0123562 A1 | 5/2014 | Voronin | |
| 2014/0174633 A1 * | 6/2014 | Andersin | C04B 35/58021 156/89.27 |
| 2014/0283457 A1 | 9/2014 | Cariveau et al. | |
| 2014/0318392 A1 | 10/2014 | Sajgalik et al. | |
| 2015/0075714 A1 | 3/2015 | Sun et al. | |
| 2015/0284833 A1 | 10/2015 | Hsiao et al. | |
| 2015/0292270 A1 | 10/2015 | Zhang et al. | |
| 2018/0029942 A1 | 2/2018 | Ishida | |
| 2018/0058148 A1 | 3/2018 | Zhang et al. | |
| 2018/0126516 A1 | 5/2018 | Kanyanta et al. | |
| 2018/0202234 A1 | 7/2018 | Saini et al. | |
| 2018/0208511 A1 | 7/2018 | Liang et al. | |
| 2018/0215671 A1 | 8/2018 | Sani et al. | |
| 2018/0265416 A1 | 9/2018 | Ishida et al. | |
| 2019/0078390 A1 | 3/2019 | Belnap et al. | |
| 2020/0001367 A1 | 1/2020 | Duffy et al. | |
| 2021/0032934 A1 | 2/2021 | Zhan et al. | |
| 2021/0034029 A1 | 2/2021 | Zhan et al. | |
| 2021/0238102 A1 | 8/2021 | Terasaki | |
| 2021/0277721 A1 | 9/2021 | Portwood et al. | |
| 2022/0250989 A1 | 8/2022 | Zhan et al. | |
| 2023/0201921 A1 | 6/2023 | Zhan et al. | |
| 2023/0212914 A1 | 7/2023 | Zhan et al. | |

FOREIGN PATENT DOCUMENTS

| | | |
|---|---|---|
| CN | 105127430 | 12/2015 |
| CN | 103953279 | 2/2016 |
| CN | 106119763 | 11/2016 |
| CN | 103803985 | 8/2017 |
| CN | 108950561 | 12/2018 |
| CN | 109046179 | 12/2018 |
| CN | 109437920 | 3/2019 |
| CN | 110369714 | 10/2019 |
| EP | 0437855 | 7/1991 |
| EP | 3333141 | 6/2018 |
| GB | 1572460 | 7/1980 |
| GB | 1574615 | 9/1980 |
| JP | S 62274034 | 11/1987 |
| JP | 2009067609 | 4/2009 |
| JP | 4275896 | 6/2009 |
| JP | 5013156 | 8/2012 |
| WO | WO 81/003295 | 11/1981 |
| WO | WO 99/036658 | 7/1999 |
| WO | WO 2006032984 | 3/2006 |
| WO | WO 2010111578 | 9/2010 |
| WO | WO 2014088569 | 6/2014 |
| WO | WO 2018167022 | 9/2018 |

OTHER PUBLICATIONS

GCC Examination Report in GCC Appln. No. GC 2020-40176, dated Sep. 7, 2021, 3 pages.

PCT International Search Report and Written Opinion in International Appln. No. PCT/US2021/034192, dated Aug. 31, 2021, 14 pages.

U.S. Appl. No. 17/336,637, Zhan et al., filed Jun. 2, 2021.

U.S. Appl. No. 63/031,077, Zhan et al., filed May 28, 2020.

U.S. Appl. No. 63/033,669, Zhan et al., filed Jun. 2, 2020.

Commer et al., "New advances in three-dimensional controlled-source electromagnetic inversion," Geophys. J. Int., 2008, 172:513-535, 23 pages.

Liu et al., "Hardness of Polycrystalline Wurtsite Boron Nitride (wBN) Compacts," Scientific Reports, Jul. 2019, 9(1), 6 pages.

Liu et al., "Superstrong micro-grained polycrystalline diamond compact through work hardening under high pressure," Appl. Phys. Lett., Feb. 2018, 112, 6 pages.

Metco, " An Introduction to Thermal Spray," 2013, Issue 4, 24 pages.

Thefreedictionary.com [online], "Paddle", Jan. 2004, retrieved on Apr. 12, 2021, retrieved from URL <https://www.thefreedictionary.com/paddle>, 8 pages.

(56) References Cited

OTHER PUBLICATIONS

Utkin et al., "Shock Compressibility and Spallation Strength of Cubic Modification of Polycrystalline Boron Nitride," High Temperature, 2009, 47(5):628-634, 7 pages.

PCT International Search Report and Written Opinion in International Appln. No. PCT/US2020/043411, dated Oct. 23, 2020, 15 pages.

PCT International Search Report and Written Opinion in International Appln. No. PCT/US2020/043872, dated Oct. 20, 2020, 25 pages.

PCT International Search Report and Written Opinion in International Appln. No. PCT/US2021/035424, dated Sep. 20, 2021, 15 pages.

PCT International Search Report and Written Opinion in International Appln. No. PCT/US2023/010037, dated Apr. 17, 2023, 20 pages.

Aghaei, "Atomic Layer Deposition: An Overview Al 2 O 3 ALD on Carbon Nanotubes and Graphene Surfaces," Chem. Rev., 2010, 110:111-131, 22 pages.

Durrand et al., "Thick PDC, Shaped Cutters for Geothermal Drilling: A Fixed Cutter Solution for a Roller Cone Drilling Environment," 44th U.S. Rock Mechanics Symposium and 5th U.S.—Canada Rock Mechanics Symposium, Jun. 2010, 11 pages.

Fabreguette et al., "Ultrahigh x-ray reflectivity from W/Al2O3 multilayers fabricated using atomic layer deposition," Appl. Phys. Lett., 2006, 88, 013116, 3 pages.

Ju, "Rock Breaking Mechanism Analysis and Structure Design of the Conical PDC Cutter Based on Finite Element Method," Engineering Letters, Mar. 2019, 27(1):75-80, 6 pages.

Li et al., "Ultrastrong catalyst-free polycrystalline diamond," Nature Research, Scientific reports, Dec. 2020, 10:22020, 10 pages.

Meta-Braze VBC Group, "Meta-Braze Cu93Ti: Copper based brazing alloy for ceramics," 2018, 1 page.

Meta-braze.com [online], "Copper Brazing Alloys for Tungsten Carbide," available on or before Sep. 30, 2020 via Internet Archive Wayback Machine URL <https://web.archive.org/web/20200930185357/https://www.meta-braze.com/products/base-metal-brazing-alloys/copper-brazing-alloys-for-tungsten-carbide>, retrieved on Mar. 15, 22, retrieved from URL <https://www.meta-braze.com/products/base-metal-brazing-alloys/copper-brazing-alloys-for-tungsten-carbide>, 2 pages.

Meta-braze.com [online], "Nickel based Brazing Alloys," available on or before Aug. 12, 2020 via Wayback Machine Archive URL <https://web.archive.org/web/20200812204140/https://www.meta-braze.com/products/base-metal-brazing-alloys/nickel-based-brazing-alloys>, retrieved on Mar. 15, 22, retrieved from URL <https://www.meta-braze.com/products/base-metal-brazing-alloys/nickel-based-brazing-alloys>, 3 pages.

U.S. Appl. No. 17/549,290, Xu et al., Producing Polycrystalline Diamond Compact Cutters With Coatings, filed Dec. 13, 2021, 61 pages.

U.S. Appl. No. 17/567,531, Zhan et al., Producing Polycrystalline Diamond Compact (PDC) Drill Bits With Catalyst-Free and Substrate-Free PDC Cutters, filed Jan. 3, 2022, 49 pages.

U.S. Appl. No. 17/740,741, Zhan et al., Fabricating Drill Bits, filed May 10, 2022, 47 pages.

Xiong et al., "Comparative analysis cutting characteristics of stinger PDC cutter and conventional PDC cutter," Journal of Petroleum Science and Engineering, 2020, 189:106792, 13 pages.

Zhan et al., "New Ultra-Strong and Catalyst-Free PDC Cutting Element Technology," IPTC-19764-MS, International Petroleum Technology Conference, Jan. 13-15, 2020, 12 pages.

PCT International Search Report and Written Opinion in International Appln. No. PCT/US2023/019553, dated Jul. 18, 2023, 20 pages.

CN Office Action in Chinese Appln. No. 202180038314.9, dated Jul. 18, 2023, 24 pages, with English Translation.

\* cited by examiner

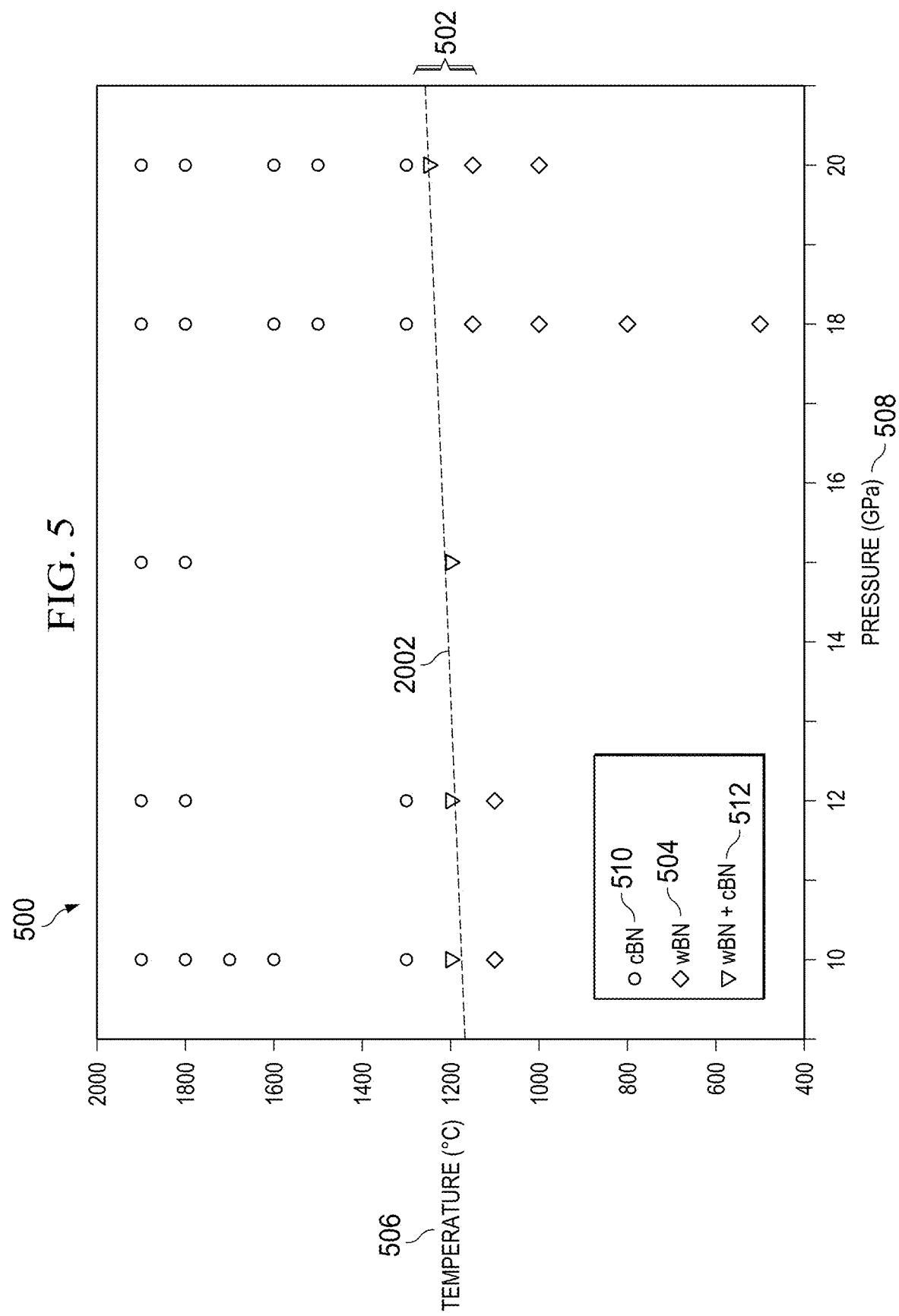

BN) DRILLING TOOLS MADE OF WURTZITE BORON NITRIDE (W-BN)

CROSS-REFERENCE TO RELATED APPLICATION(S)

This application claims the benefit of priority to U.S. Provisional Application Ser. No. 63/031,077, filed May 28, 2020, the contents of which are hereby incorporated by reference.

TECHNICAL FIELD

This disclosure relates to drilling, and in particular, drilling for oil and gas applications.

BACKGROUND

Well drilling is the process of drilling a hole (wellbore) in the Earth. Drill bits are cutting tools that are commonly used in drilling. Drill bits come in various sizes and shapes and can create different kinds of holes in various materials. In order to form a wellbore, drill bits are typically attached to a drill which powers them to cut through rock (for example, by rotation). A few examples of materials that are typically used to construct drill bits include polycrystalline diamond compact, grit hotpressed inserts, and natural diamond. The effectiveness of a drill bit can vary based on formation type.

SUMMARY

The present disclosure describes techniques that can be used for synthesizing (and coating tools with) a single-phase, pure, polycrystalline wurtzite boron nitride (w-BN) material.

In a first implementation, a method is implemented to form a tool for oil and gas application from wurtzite boron nitride (w-BN) superhard material. An ultra-high-pressure, high-temperature operation is performed on pure w-BN powder to synthesize w-BN and cubic boron nitride (c-BN) compact having a first size greater than particles of the pure w-BN powder. The ultra-high-pressure, high-temperature operation includes pressurizing the w-BN powder to a pressure of approximately 20 Gigapascal, heating the w-BN powder at a heating rate of 100° C./minute and cooling the w-BN powder at a cooling rate of 50° C./minute. The compact is cut into a plurality of cut compacts having a second size smaller than the first size using laser cutting tools. The plurality of cut compacts is inserted within a respective plurality of recesses formed in a tool substrate. The tool substrate with the plurality of inserted cut compacts is heated. After heating the tool substrate, the tool substrate with the plurality of inserted cut compacts is cooled to form the tool.

The foregoing and other described implementations can each, optionally, include one or more of the following features:

A first feature, combinable with any of the following features, in which the plurality of cut compacts is mixed with an additive that includes at least one binder for binding the plurality of cut compacts metallurgically onto the tool substrate, mechanically onto the tool substrate, or both metallurgically and mechanically onto the tool substrate.

A second feature, combinable with any of the previous or following features, in which one or more of the plurality of cut compacts are identified as having a size greater than a threshold size of a size range, and the one or more of the plurality of cut compacts having the size greater than the threshold size are re-cut using the laser cutting tools.

A third feature, combinable with any of the previous or following features, in which identifying the one or more of the plurality of cut compacts having the size greater than the threshold size includes using a laser scanner to measure the plurality of cut compacts.

A fourth feature, combinable with any of the previous or following features, in which the compact is cooled with a cooling liquid during a cutting process that includes the cutting.

A fifth feature, combinable with any of the previous or following features, in which a pressure and temperature window at which the ultra-high-pressure, high-temperature operation forms the compact is determined; and the ultra-high-pressure, high-temperature operation is executed within the pressure and temperature window.

A sixth feature, combinable with any of the previous or following features, in which the compact has an octahedron shape.

A seventh feature, combinable with any of the previous or following features, in which heating the tool substrate includes heating the tool substrate to a temperature in a range of from 200° C. to 300° C. at a heating rate in a range of from 5° C./minute to 10° C./minute.

An eighth feature, combinable with any of the previous features, in which cooling the tool substrate includes cooling the tool substrate at a cooling rate in a range of from 10° C./minute to 20° C./minute.

In a second implementation, a system includes one or more processors and a non-transitory computer-readable storage medium coupled to the one or more processors and storing programming instructions for execution by the one or more processors, the programming instructions instructing the one or more processors to perform operations including the following. An ultra-high-pressure, high-temperature operation is performed on pure w-BN powder to synthesize w-BN and cubic boron nitride (c-BN) compact having a first size greater than particles of the pure w-BN powder. The ultra-high-pressure, high-temperature operation includes pressurizing the w-BN powder to a pressure of approximately 20 Gigapascal, heating the w-BN powder at a heating rate of 100° C./minute and cooling the w-BN powder at a cooling rate of 50° C./minute. The compact is cut into a plurality of cut compacts having a second size smaller than the first size using laser cutting tools. The plurality of cut compacts is inserted within a respective plurality of recesses formed in a tool substrate. The tool substrate with the plurality of inserted cut compacts is heated. After heating the tool substrate, the tool substrate with the plurality of inserted cut compacts is cooled to form a tool for oil and gas application (for example, a drilling tool).

The foregoing and other described implementations can each, optionally, include one or more of the following features:

A first feature, combinable with any of the following features, in which the operations include mixing the plurality of cut compacts with an additive that includes at least one binder for binding the plurality of cut compacts metallurgically onto the tool substrate, mechanically onto the tool substrate, or both metallurgically and mechanically onto the tool substrate.

A second feature, combinable with any of the previous or following features, in which the operations include identifying one or more of the plurality of cut compacts as having a size greater than a threshold size of a size range and re-cutting, using the laser cutting tools, the one or more of the plurality of cut compacts having the size greater than the threshold size.

A third feature, combinable with any of the previous or following features, in which identifying the one or more of the plurality of cut compacts having the size greater than the threshold size includes using a laser scanner to measure the plurality of cut compacts.

A fourth feature, combinable with any of the previous or following features, in which the operations include cooling the compact with a cooling liquid during a cutting process that includes the cutting.

A fifth feature, combinable with any of the previous or following features, in which the operations include determining a pressure and temperature window at which the ultra-high-pressure, high-temperature operation forms the compact and executing the ultra-high-pressure, high-temperature operation within the pressure and temperature window.

A sixth feature, combinable with any of the previous or following features, in which heating the tool substrate includes heating the tool substrate to a temperature in a range of from 200° C. to 300° C. at a heating rate in a range of from 5° C./minute to 10° C./minute.

A seventh feature, combinable with any of the previous features, in which cooling the tool substrate includes cooling the tool substrate at a cooling rate in a range of from 10° C./minute to 20° C./minute.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 5 is a graph showing an example of a phase diagram identifying an operating window for w-BN composition.

DETAILED DESCRIPTION

The following detailed description describes techniques for synthesizing a single-phase, pure, polycrystalline wurtzite boron nitride (w-BN) material and incorporating this material into tools for oil and gas applications. The w-BN material is a superhard material which can be incorporated, for example, into drilling tools. Conventional drilling tools may not provide enough wear resistance and thermal stability for some drilling applications.

In some implementations, techniques can include an ultra-high-pressure, high-temperature (UHPHT) operation performed on pure w-BN powder to synthesize w-BN grits (for example, greater than 20 microns) that are greater than the particles of powder. For example, the techniques can produce favorable results in a range of 10-20 gigapascals (GPa) and a temperature range of 1100-1300° C. In particular, the UHPHT operation can include pressurizing the w-BN powder to a pressure of about 20 GPa at heating rates of 100° C./minute (min) and cooling rates of 50° C./min. The resulting grits can be cut using laser cutting tools, sized by laser scanning, and bonded onto a tool substrate to form the tool. The tool can be, for example, a drilling tool or tools used in hydrocarbon exploration or production applications, such as related to oil and gas wells.

Figure 1:
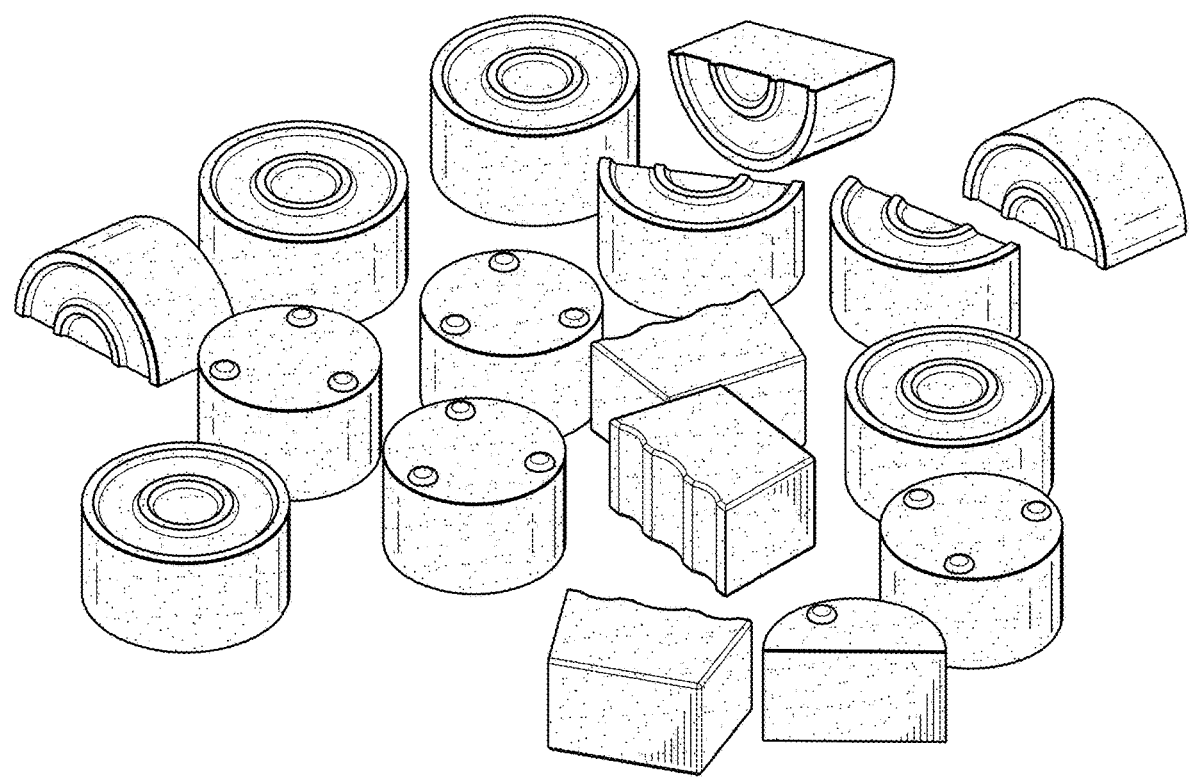
FIG. 1 is a diagram showing examples of different types of wurtzite boron nitride (w-BN) inserts.

FIG. 1 is a diagram showing examples of different types of w-BN inserts, according to some implementations of the present disclosure. For example, drilling tools can be constructed using drilling materials such as w-BN with different morphologies such as the w-BN inserts shown in FIG. 1. The Vickers hardness of w-BN can range from 40 GPa to 60 GPa, depending on grain size.

In some implementations, drilling tools can be manufactured with catalyst-free, superstrong BN materials made using ultra-high-pressure, high-temperature (HPHT) technology. Manufacturing processes can include designing a two-stage multi-anvil apparatus. The apparatus can be based on cubic press equipment with innovative pressure/temperature media and new high-pressure assemble ratios (for example, octahedron edge length or truncated edge length) for generating ultra-high pressures up to 35 GPa and high temperatures up to 2,000° C.

Manufacturing processes can use different forms of boron nitride, a material which crystallizes in hexagonal, cubic, and wurtzitic structures. Hexagonal boron nitride (h-BN) is a stable phase at ordinary temperature and pressure. Cubic boron nitride (c-BN) and wurtzitic boron nitride (w-BN) can be synthesized at ultra-high pressure and high temperature. Cubic boron nitride (c-BN) cutting tools have been developed mainly for finishing applications to hardened steel, chilled cast iron (Fe), and 35 Rockwell Hardness Scale C (HRC) or more of cobalt and nickel-based superalloys. However, cubic boron nitride cutting tools can present limitations on the use in workover milling due to more brittleness stemming from less strength and toughness. Being different from c-BN, w-BN has a toughness and strength greater than c-BN, making w-BN suitable for cutting or milling various materials such as a variety of hardened steel (for example, carbon tool steel, alloy tool steel, high-speed steel, bearing steel, and tool steel), chilled cast iron, cobalt- and nickel-based high-temperature alloys, tungsten carbide, surface coating (solder) materials, titanium alloys, pure nickel, and pure tungsten that can be encountered in workover milling applications. A certain amount of information has been reported concerning the mechanical properties of c-BN, in particular its hardness, which is equal to 45-50 GPa. However, virtually nothing is known as yet about the mechanical properties of the w-BN, as wurtzite is a metastable phase of BN at all pressures and temperatures and wurtzite is difficult to prepare as a pure phase. Several results suggest that w-BN may be as hard or harder than diamond, even while w-BN and c-BN have a similar bond length, elastic moduli, ideal tensile, and shear strength.

In experiments associated with the present disclosure, high purity w-BN and c-BN compact (for example, over 99% pure) were successfully synthesized from w-BN powder under ultra-high pressure (for example, a pressure of approximately 20 GPa) and high temperature (for example, in the range of 1100-1300° C.), and the compact microstructure and thermal stability were investigated. The w-BN powders were used as starting materials after a vacuum heat-treatment at 400° C. The majority of experiments were performed using a two-stage (6-8 system) multi-anvil apparatus. The pressure was calibrated by means of the well-known pressure-induced phase transitions and the cell temperature was measured directly using a Tungsten-Rhenium (W-Re) 3% to 25% Rhenium content thermocouple. Wurtzitic boron nitride powder was compressed to a pressure of 20 GPa and heated with a heating rate of 100° C./min to the desired value. The duration of heating was 30 min. The samples were quenched to an ambient temperature with a cooling rate of about 50° C./min and then decompressed to ambient pressure.

In some implementations, the w-BN compact is mixed with an additive to improve bonding of the w-BN compact to a tool substrate to form the drilling tool. The additive includes one or more binder materials. Binder materials can include iron (Fe), cobalt (Co), nickel (Ni), or their alloys. Binders can include refractory metals and alloys, such as tungsten alloys, tantalum (Ta), molybdenum (Mo), and niobium (Nb).

Figure 2A:
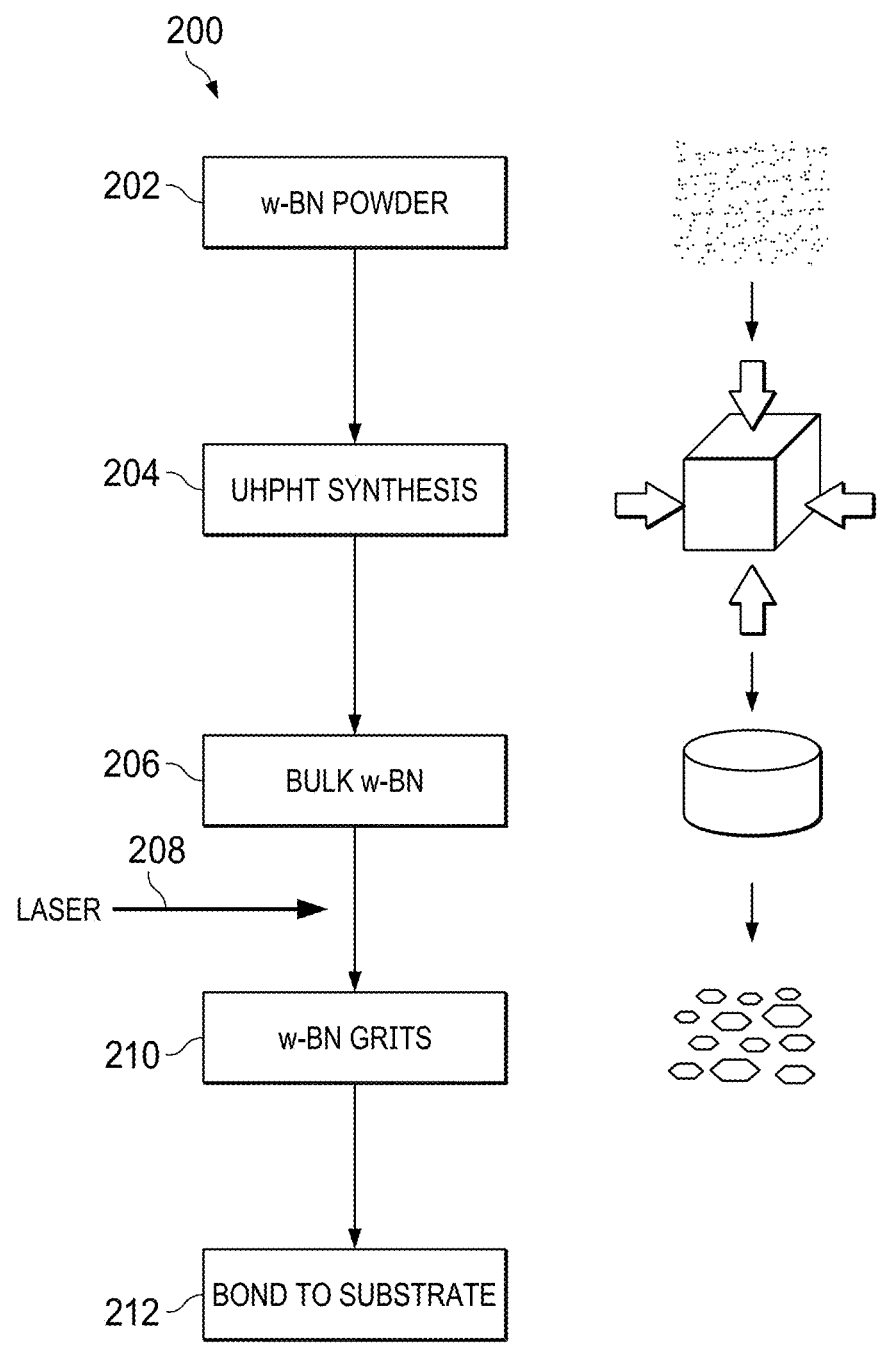
FIG. 2A is a flow diagram showing an example of a w-BN superhard drilling tools manufacturing process.

FIG. 2A is a flow diagram showing an example of a w-BN superhard drilling tools manufacturing process 200, according to some implementations of the present disclosure. The process 200 can begin with the production of a w-BN powder 202. At 204, UHPHT synthesis can be used to create greater-sized solids from the w-BN powder 202. The greater-sized solids can be used to create bulk w-BN 206. A laser 208 can be used to create w-BN grits 210 from the bulk w-BN 206. At 212, the w-BN grits 210 are bonded to a tool substrate to form the drilling tool. In some implementations, the w-BN superhard drilling tools manufacturing process 200 can use a w-BN powder or grit form, heated to a binder molten or semi-molten state and accelerated toward the tool substrate in the form of micrometer-size particles.

In some implementations, bonding the w-BN grits 210 to the tool substrate at 212 includes inserting the w-BN grits 210 within recesses formed in the tool substrate. The tool substrate (including the w-BN grits 210 inserted within the recesses) is heated. In some implementations, the tool substrate is heated to a temperature in the range of from 200° C. to 300° C. When heated to the temperature in the range of from 200° C. to 300° C., the w-BN grits 210 (inserted within the recesses) bond to the tool substrate. In some implementations, the tool substrate is heated at a heating rate in a range of from 5° C./minute to 10° C./minute. The slow heating rate mitigates the production of internal thermal stress because internal thermal stress can reduce bonding strength of the w-BN grits 210 to the tool substrate. Heating the tool substrate at 212 at a heating rate less than 5° C./minute may be too slow to be economical. Meanwhile, heating the tool substrate at 212 at a heating rate greater than 10° C./minute may increase internal thermal stress during the heating process and consequently reduce the bonding strength of the w-BN grits 210 to the tool substrate. The tool substrate (including the w-BN grits 210 inserted within the recesses) is then cooled. In some implementations, the tool substrate is cooled at a cooling rate in a range of from 10° C./minute to 20° C./minute. The slow cooling rate also mitigates the production of a large thermal stress gradient because a large thermal stress gradient can reduce bonding strength of the w-BN grits 210 to the tool substrate and can, in some cases, de-bond one or more of the w-BN grits from the tool substrate. Cooling the tool substrate at 212 at a cooling rate less than 10° C./minute may be too slow to be economical. Cooling the tool substrate at 212 at a cooling rate greater than 20° C./minute may result in a large temperature gradient and consequently a large thermal stress gradient.

Figure 2B:
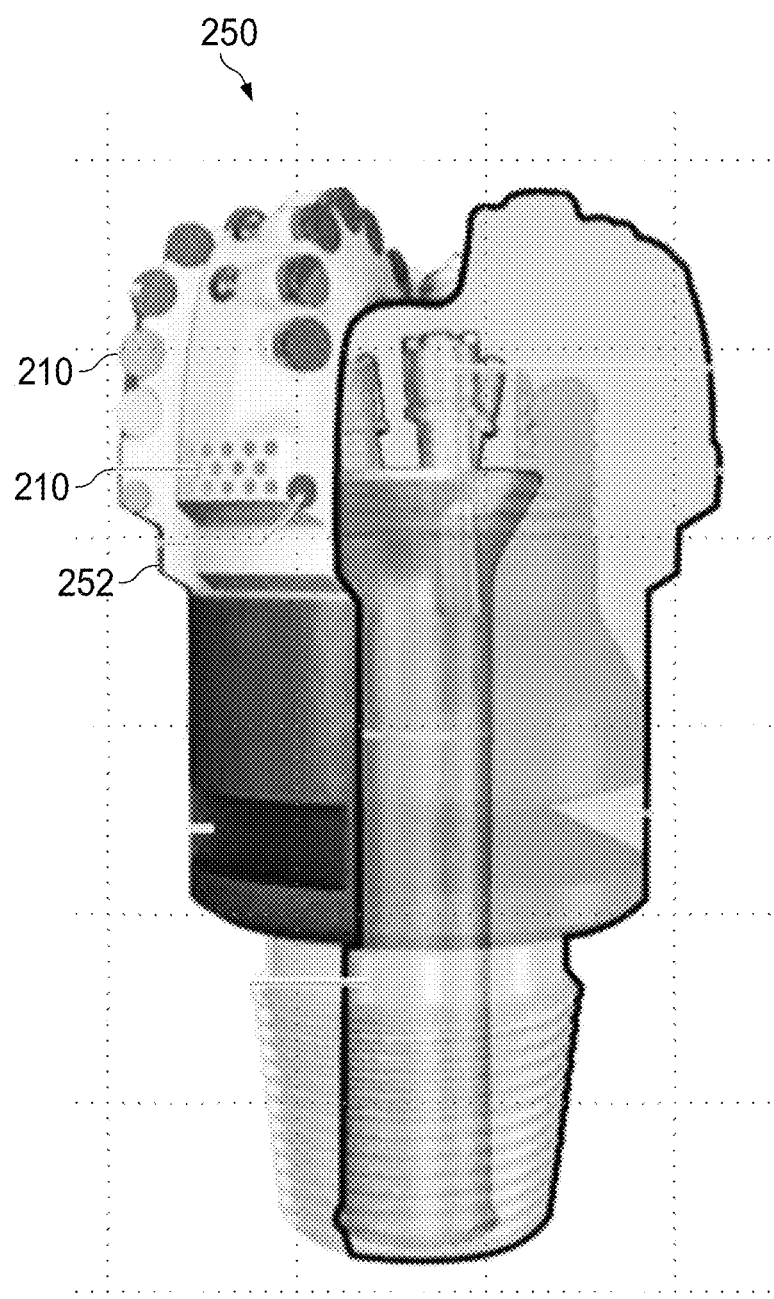
FIG. 2B is a schematic of an example of a drilling tool including w-BN inserts.

FIG. 2B is a schematic of a drilling tool 250 that includes the w-BN inserts (w-BN grits 210) seated within and bonded to recesses formed in the gauge pad 252 (substrate) of the drilling tool 250. As shown in FIG. 2B, the w-BN grits 210 can have various sizes.

Figure 3A:
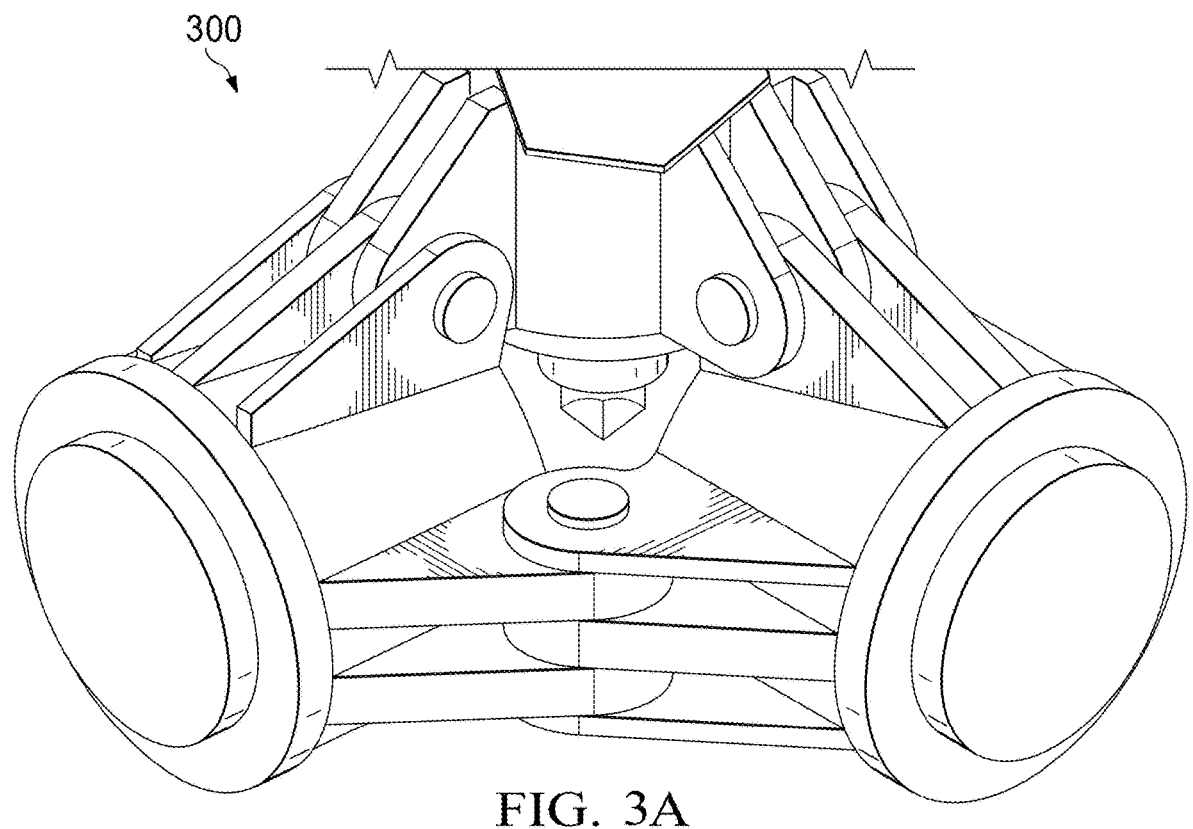
FIG. 3A is a schematic of an apparatus in which w-BN grits are synthesized from pure w-BN powder.
Figure 3B:
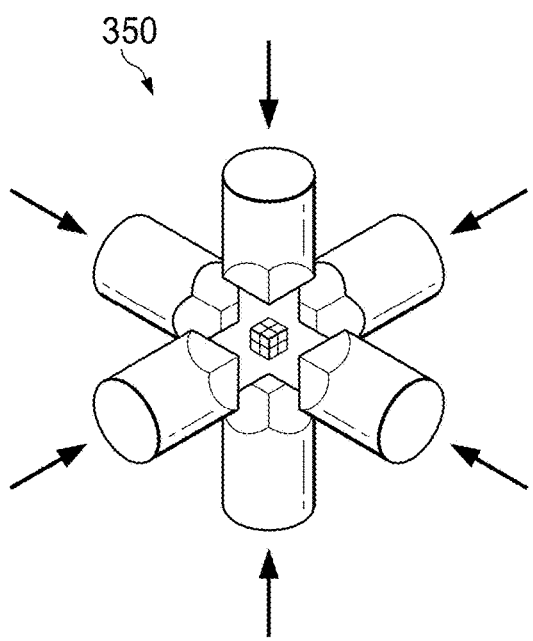
FIG. 3B is a schematic of a first-stage cube pressure booster device of the apparatus of FIG. 3A.

FIG. 3A is a schematic of an apparatus 300 in which w-BN grits are synthesized from pure w-BN powder, according to some implementations of the present disclosure. FIG. 3B is a schematic of a first-stage cube pressure booster device 350 of the apparatus 300, according to some implementations of the present disclosure. The apparatus 300 can also include a second-stage octahedral pressure booster device used in a process to convert cubes to octahedra.

The first-stage cube pressure booster device 350 can provide a primary pressure cavity formed by six anvil-shaped square carbide alloy anvils. The hydraulic cylinders can be pushed forward across three axes, together forming a cubic pressure chamber. The second-stage octahedral pressure booster device can include eight angled squares of WC-Co cemented carbide (or end-stage anvils), forming an eight-sided high-pressure cavity inside which the pressure media are placed. At an end-stage of the anvil propulsion, the eight-faced medium is pressured (for example, rheologically deformed) to produce a sealing edge, with the end anvil faces forming the second-stage ultra-high-pressure chamber.

In some implementations, assembly features of the second-stage pressure chamber of a large cavity static high-pressure device can include the following. Assembly can result in a length, a, of the eight-sided pressure media (for example, 1 mm) and the end-stage anvil truncation length, b, where a/b can be a design feature of the whole system design. The parameters can reflect the assembly of the basic structure of the two-stage pressure chamber and the approximate size of the sample that can be produced.

Figure 4A:
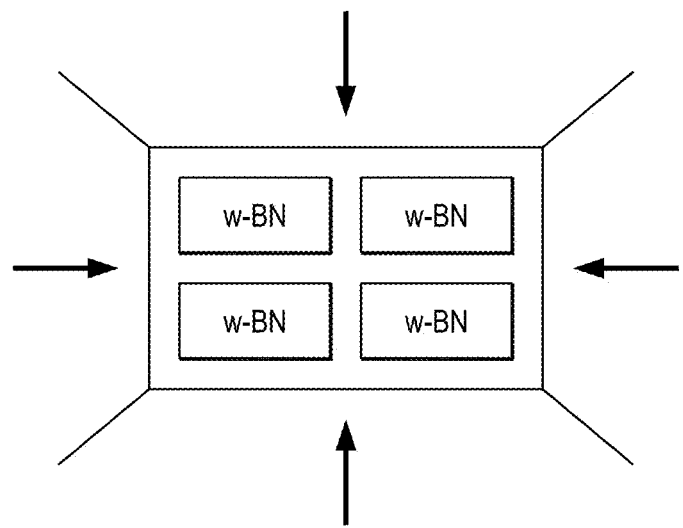
FIG. 4A is a block diagram showing examples of forces used to create w-BN grits from pure w-BN powder.
Figure 4B:
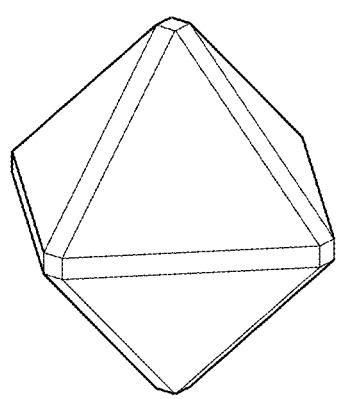
FIG. 4B is a drawing of an example of an octahedron produced by the apparatus of FIG. 3A.

FIG. 4A is a block diagram showing examples of forces used to create w-BN grits from pure w-BN powder, according to some implementations of the present disclosure. FIG. 4B is a drawing of an example of an octahedron produced by the apparatus 300, according to some implementations of the present disclosure. In some implementations, techniques can be used for laser scanning to cut bulk w-BN to produce grits. Binder can be added to the grits of smaller sizes, such as by blending the binder and the grits using turbulent mixing under vacuum. In some implementations, powder or particle blending or mixing techniques can include the use of laminates or turbulence. Turbulent blending may be better suited for w-BN particle combination. For example, a rotary mixer can be configured in a double conical or V-shaped configuration. In some implementations, configuration geometries can be used that have asymmetries that reduce mixing time and improve mixing uniformity. Mixers using such configuration geometries, for example, can operate at 5 to 25 revolutions per minute, with filling levels ranging from 50% to 75%.

FIG. 5 is a graph showing an example of a phase diagram 500 identifying a narrow window 502 for w-BN 504 composition, according to some implementations of the present disclosure. As shown in the phase diagram 500, the window for w-BN 504 composition is very narrow as a combination of temperature 506 and pressure 508. Outside of the window, it is difficult to produce w-BN 504. For example, c-BN 510 is produced at temperatures 506 higher than temperatures in the window, and w-BN+c-BN 512 is produced at temperatures 506 higher than temperatures in the window. This new w-BN bulk material comes from the w-BN startup power with excellent performance. The maximum pressure of traditional HPHT processes (such as diamond grits synthesis and PDC Cutters) is typically limited to 8 GPa due to graphite heater problems. This is because, at a pressure exceeding 8 GPa, the conductive graphite heater will lose its function by converting to insulated diamond. When the pressure exceeds 10 GPa, UHPHT conditions are created that requires special pressure cell design and new heater materials. It is not simple to increase the pressure from the 10 GPa to 20 GPa by the traditional HPHT technology to make the w-BN. However, UHPHT devices can make w-BN from 10 GPa to 20 GPa. Higher pressures typically lead to better performance. Experimentation has found that a slow heating speed is very important for obtaining good sintering specimens. Because the w-BN is converted to c-BN, the slow heating rate can lead to the microstructure of the long rod. When the heating rate increases, the grain size increases rapidly, and the hardness decreases.

Figure 6:
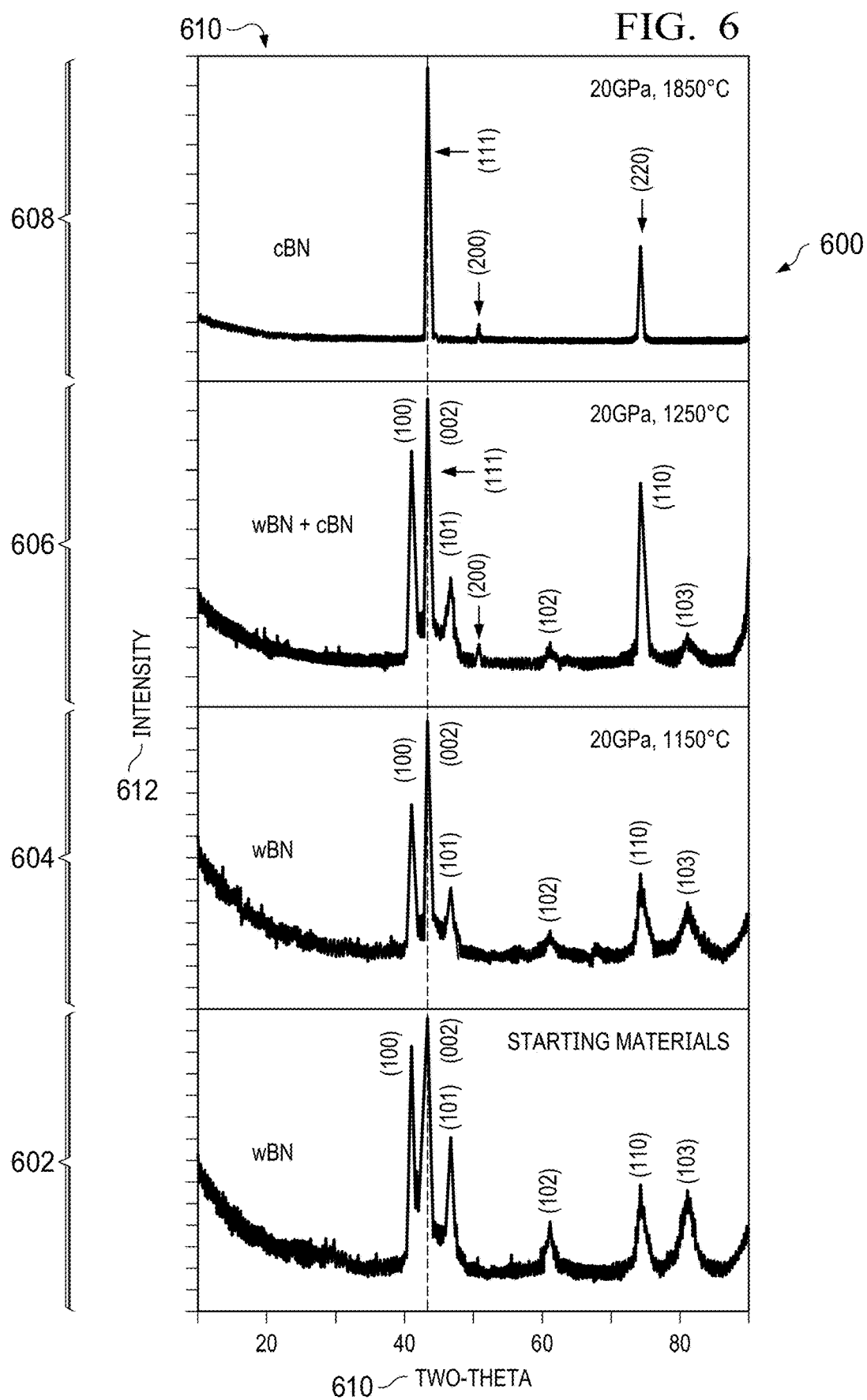
FIG. 6 is a graph showing an example of X-ray diffraction (XRD) results before and after an ultra-high-pressure, high-temperature (UHPHT) process.

FIG. 6 is a graph 600 showing an example of X-ray diffraction (XRD) results before and after an ultra-high-pressure and high-temperature (UHPHT) process, according to some implementations of the present disclosure. The phase composition of the sintered samples was investigated by XRD analysis with CuKα radiation. The investigation showed that a pure single phase w-BN was successfully synthesized.

The graph 600 includes subgraphs 602, 604, 606, and 608 relative to a theta value 610 on the x-axis and an intensity 612 on the y-axis. The subgraphs 602, 604, 606, and 608 plot intensity values for w-BN starting materials, w-BN at 20 GPa and 1150° C., w-BN+c-BN at 20 GPa and 1250° C., and c-BN at 20 GPa and 1850° C., respectively.

To obtain the graph 600, microstructures of sintered samples were characterized using scanning electron microscopy (SEM). Vickers hardness of the polished samples was tested with different applied loading forces and a fixed indenting time of 15 s by a Vickers hardness tester. The thermal gravimetric analysis (TGA) was carried out in air with a heating rate of 10° C./min from 30° C. to 1400° C.

The Vickers hardness of the w-BN compact was determined to be approximately 60 GPa. The onset oxidation temperature of 920° C. in air was much greater than diamond and WC. This generation of UHPHT w-BN material can provide improved performance in terms of wear resistance, impact tolerance, and thermal stability conductivity in comparison to tools made from conventional materials. Enhanced run life can be expected with drilling tools including these w-BN materials. Due to the improved performance of the superstrong w-BN material, the drilling tools can be designed to have the least thickness and smallest dimensions to surpass conventional drilling materials in terms of reliability, lifetime, and cost-effectiveness.

Figure 7:
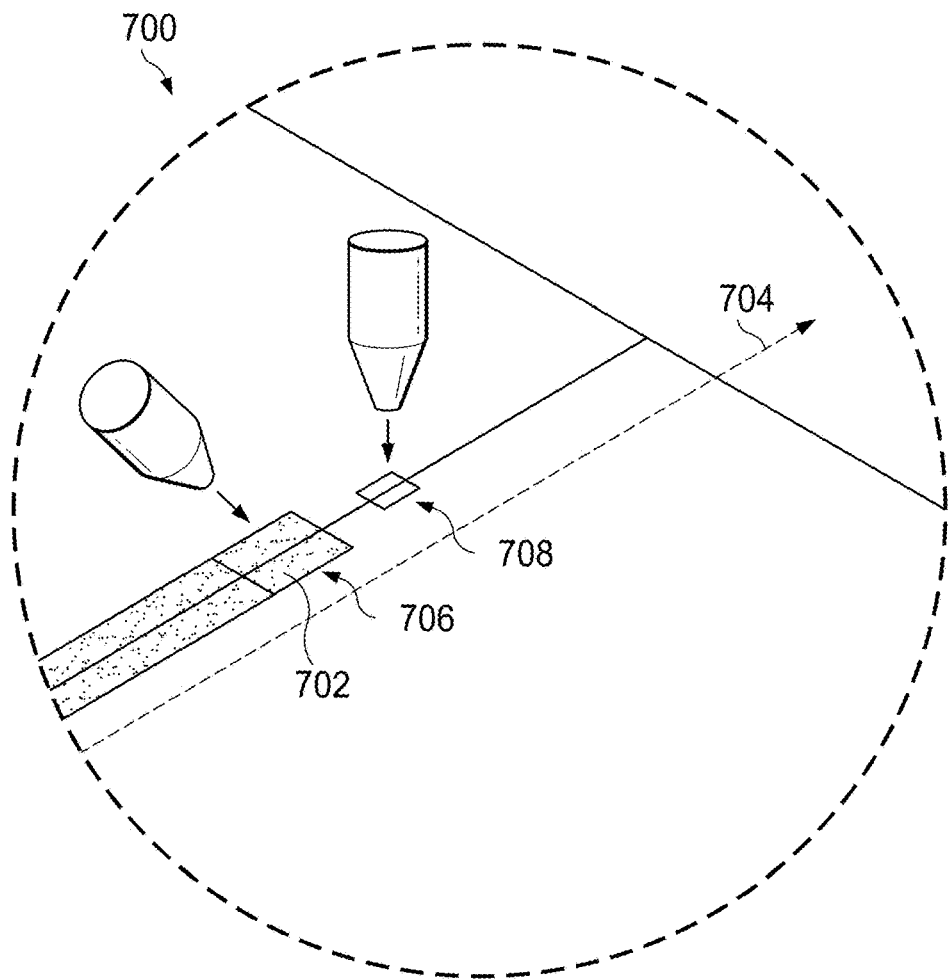
FIG. 7 is a block diagram showing an example of a laser process for cutting bulk w-BN into smaller grit sizes.

FIG. 7 is a block diagram showing an example of a laser process 700 for cutting bulk w-BN into smaller grit sizes, according to some implementations of the present disclosure. The example, the laser process 700 can be used to cut w-BN blanks 702 which are processed in a cutting path 704. In some implementations, the laser process 700 can use laser cutting technology that injects water at a water-jet spot 706 and uses at least one laser at a laser spot 708. Placement of the laser(s) can determine w-BN grit size characterization. Different ranges of grit sizes can be used mixing with a binder. The process 700 can be repeated, first with laser cutting and then laser scanning. For example, if grit sizes are in the desired size ranges, then mixing or blending can occur. Otherwise, laser cutting can be repeated until the grits are in a particular grit size range. The process 700 can include laser cutting and laser scanning that occur in parallel or sequentially.

In some implementations, w-BN grits and a binder can be mixed using turbulent mixing under a vacuum. For example, blades, paddles, or screw elements can be used to invert powders, in which case a large amount of material is moved from one place to another in a 360-degree rotation. In some implementations, the grits can be sorted by size prior to mixing with binder. For example, particle or grit size distribution measurements can be done using a laser diffraction and scatting method. The w-BN grits and the binder can be transported from a cutting chamber to the mixer using separate funnel valves. Mixing chambers can be implemented as fluidized bed reactor, where turbulent mixing can include spinning rates from 100 to 1000 revolutions per minute (rpm). Mixing under the vacuum can help to reduce impurities that may have been introduced during the cutting process.

Laser cutting technology that is used to cut bulk w-BN into smaller sizes can include the use of a continuous wave $CO_2$ laser that is combined with other heat sources, such as plasma, electron beam, and a water jet, to improve the processing efficiency and quality of BN. For example, $CO_2$-water jet processing systems can realize high power laser heating, followed by low-pressure water jet quenching (for example, at the water-jet spot 706), which can realize the fracture start and can control propagation along the cutting path. Laser water-jet processing techniques can use a completely different mechanism from traditional laser processing to remove material by melting and ablation. For example, by controlling crack propagation, the material separation can be realized and the speed can be faster than non-laser water-jet processing techniques, with no thermal impact zone. In conventional systems, main sources of fracture propagation typically are laser rapid heating and thermal stress caused by water-jet quenching on the surface of samples in ceramic cutting, with low thermal conductivity, such as using aluminum nitride (AlN). In the cutting process of high-thermal-conductivity BN, the temperature gradient can be insignificant (for example, without providing additional thermal stress). A major consideration of BN processing is the stress caused by the change of the volume of the converted material. The volume change can trigger the tensile stress field in the transformation area, which can induce the expansion and separation of the initial crack of the material in the whole thickness.

Figure 8:
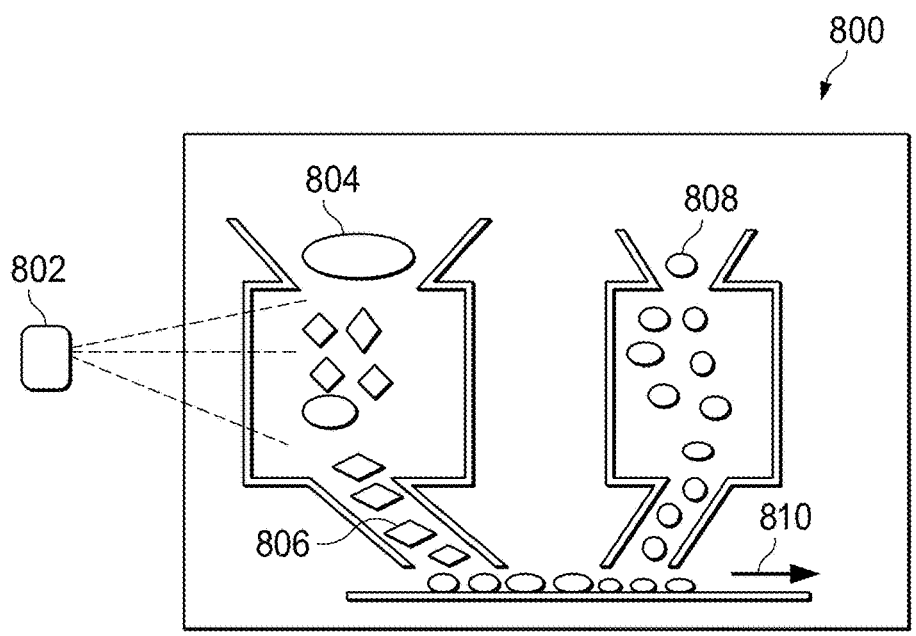
FIG. 8 is a block diagram of an example of a vacuum chamber for powder and grit processing.

FIG. 8 is a block diagram of an example of a vacuum chamber 2300 for powder and grit processing, according to some implementations of the present disclosure. For example, the vacuum chamber 800 can be used with 3D laser scanning 802 in a process used to convert physical objects into precise digital models. Inside the vacuum chamber 800, bulk w-BN 804 can be scanned and cut into w-BN grits 806. An active binder feed 808 can supply binder funneled and combined with the w-BN grits 806 for blending 810. The 3D laser scanning can enable fast and accurate capture of an object's shape and geometries, for example. Particle sizing by laser diffraction can be used as a particle sizing technique for producing particles in the range of 0.5 to 1000 microns. Laser diffraction works on the principle that when a beam of light (a laser) is scattered by a group of particles, the angle of light scattering is inversely proportional to particle size. For example, using smaller particle sizes can increase the angle of light scattering. The use of 3D laser scanning and laser diffraction can be used to filter grits by size, including identifying grits that are too large or too small. If laser scanning reveals that a grit is too large or too small (for example, outside the range of 0.5 to 1000 microns), then the grit can be prevented from being transported to the additive blender. Grits that are within the size range can be transported to an additive blender, while grits that are too large can be re-cut using a serving process.

Figure 9:
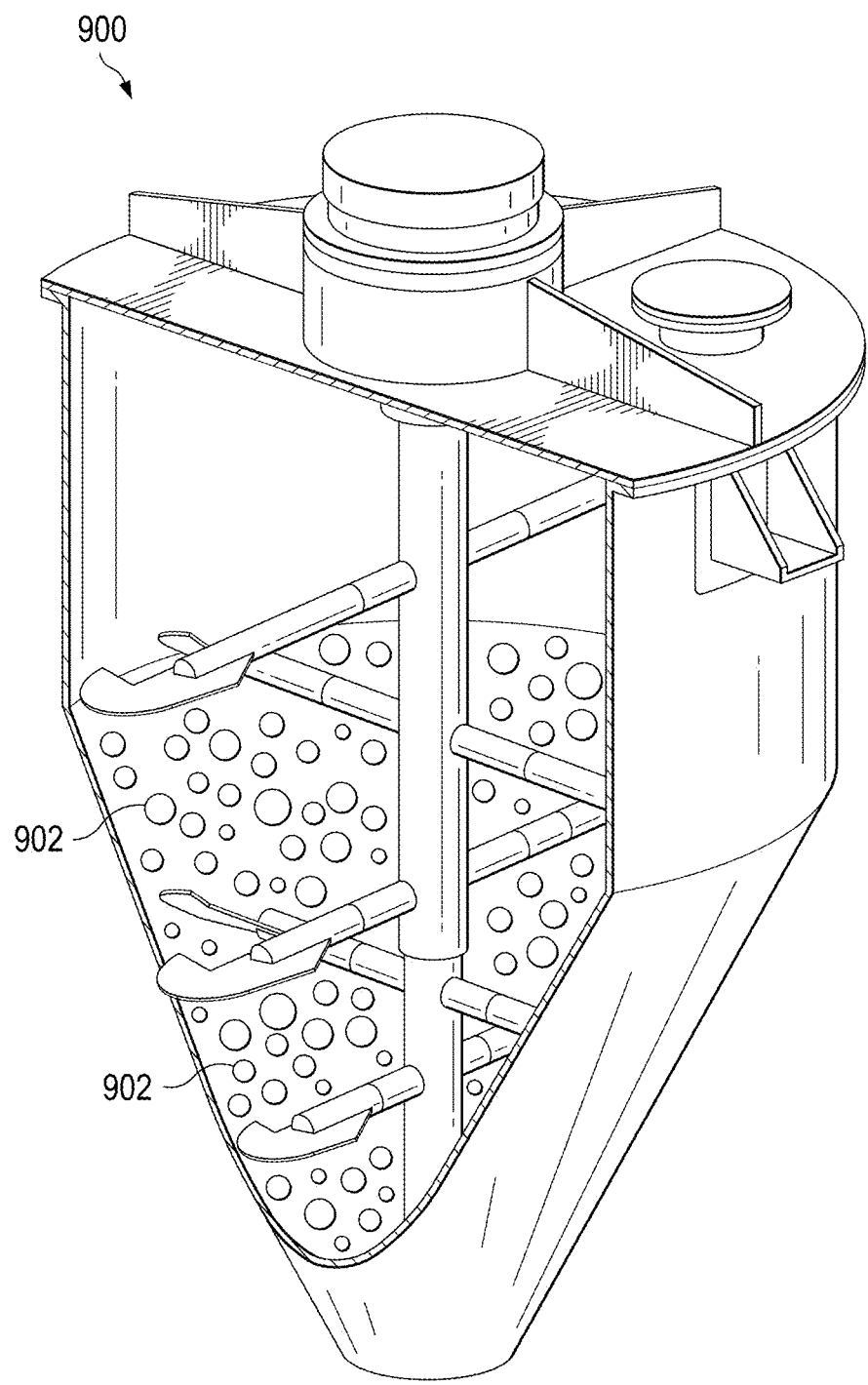
FIG. 9 is a schematic diagram of an example of a mixer for mixing w-BN grits with binder.

FIG. 9 is a schematic diagram of an example of mixer 900 for mixing w-BN grits 902 with binder, according to some implementations of the present disclosure. The mixer 900 can include blades, paddles, or screw elements to invert powders and move large amounts of material into multiple places in the mixer 900 in a 360-degree rotation. The mixer 900 can be used for mixing powders, granules, and solids with liquids. A conical paddle mixer configuration of the mixer 900 can provide high accuracy and fast mixing with limited product distortion.

Figure 10A:
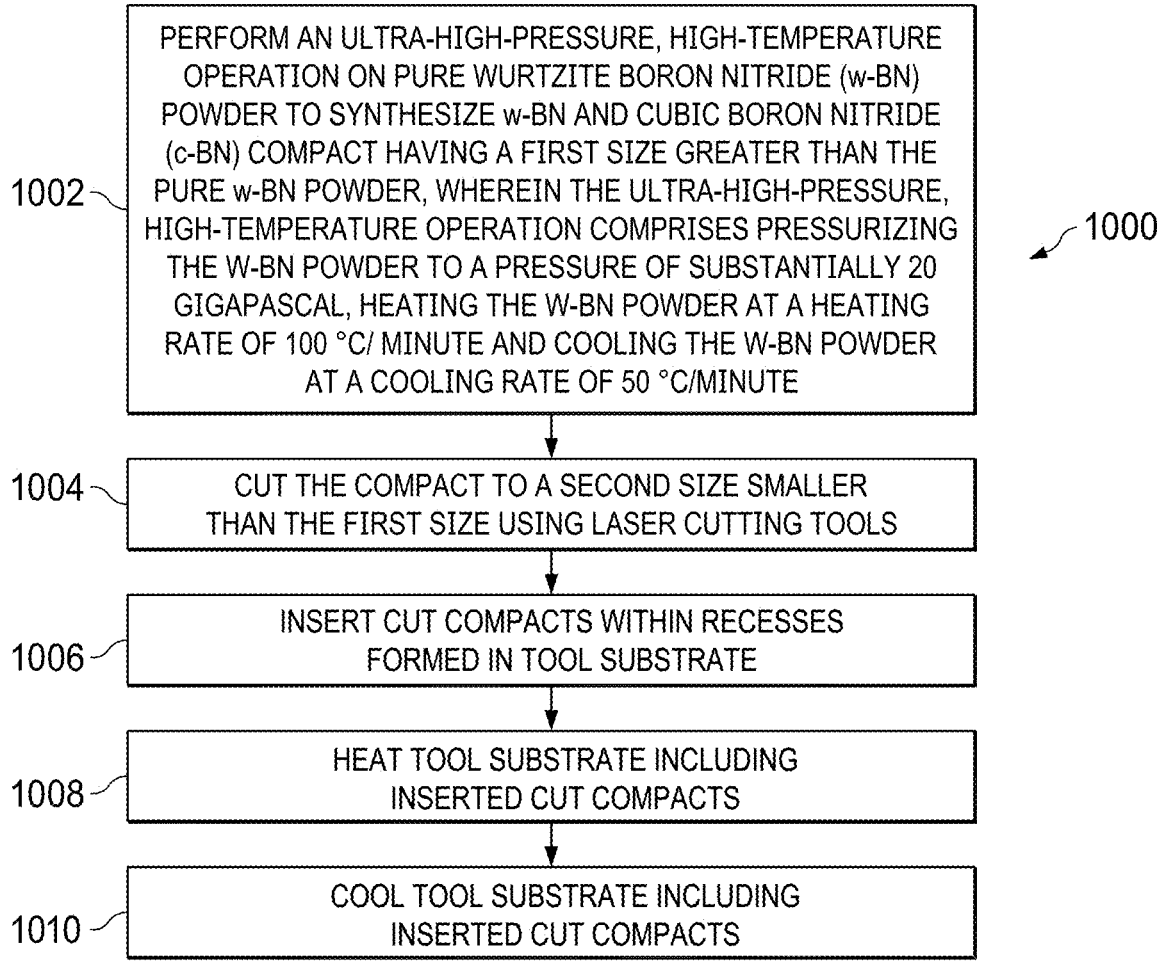
FIG. 10A is a flowchart of an example method for synthesizing a w-BN and cubic boron nitride (c-BN) compact for bonding to a tool substrate.

FIG. 10A is a flowchart of an example method 1000 for synthesizing a w-BN and cubic boron nitride (c-BN) compact for bonding to a tool substrate, according to some implementations of the present disclosure. For clarity of presentation, the description that follows generally describes method 1000 in the context of the other figures in this description. However, it will be understood that method 1000 can be performed, for example, by any suitable system, environment, software, and hardware, or a combination of systems, environments, software, and hardware, as appropriate. In some implementations, various steps of method 1000 can be run in parallel, in combination, in loops, or in any order.

At 1002, an ultra-high-pressure, high-temperature (UHPHT) operation is performed on pure w-BN powder to synthesize a w-BN and cubic boron nitride (c-BN) compact having a first size greater than particles of the pure w-BN powder. The compact can have an octahedron shape, for example, as shown in FIG. 4B. The ultra-high-pressure, high-temperature operation includes pressurizing the w-BN powder to a pressure of approximately 20 GPa, heating the w-BN powder at a heating rate of 100° C./min and cooling the w-BN powder at a cooling rate of 50° C./min. For example, the apparatus 300 can be used to synthesize w-BN grits from pure w-BN powder. From 1002, method 1000 proceeds to 1004.

At 1004, the compact is cut to a second size smaller than the first size using laser cutting tools. As an example, can be cut into smaller sizes (w-BN grits) using a laser, as described with reference to FIG. 7.

In some implementations, method 1000 includes steps for re-cutting cut compact into smaller pieces. Pieces of the cut compact having a size greater than a threshold size of a size range can be identified, such as by using laser scanner to measure the pieces. The pieces of the cut compact having the size greater than the threshold size are then re-cut using the laser cutting tools.

In some implementations, method 1000 includes cooling the compact with a cooling liquid during a cutting process that includes the cutting. For example, water-jets at a water-jet spot 706 can be used to cool the w-BN blank during the cutting process. In some implementations, the cut compact is turbulently mixed with additives in a mixer under vacuum. For example, the mixer 900 can be used to mix w-BN grits with an additive that is added through the active binder feed 808. The additives can include at least one binder for binding the cut compact metallurgically onto the tool substrate, mechanically onto the tool substrate, or both metallurgically and mechanically onto the tool substrate. From 1004, method 1000 proceeds to 1006.

At 1006, the cut compacts (w-BN grits) are inserted within recesses formed in a tool substrate. From 1006, method 1000 proceeds to 1008.

At 1008, the tool substrate, which includes the inserted cut compacts, is heated. In some implementations, the tool substrate is heated to a temperature in a range of from 200° C. to 300° C. at 1008. In some implementations, the tool substrate is heated at a heating rate in a range of from 5° C./minute to 10° C./minute at 1008. From 1008, method 1000 proceeds to 1010.

At 1010, the tool substrate, which includes the inserted cut compacts, is cooled. In some implementations, the tool substrate is cooled at a cooling rate in a range of from 10° C./minute to 20° C./min at 1010. The heating and cooling at 1008 and 1010, respectively, bonds the cut compacts to the tool substrate, thereby forming the drill tool.

In some implementations, method 1000 includes determining a pressure and temperature window at which the ultra-high-pressure, high-temperature operation forms the compact. For example, experimentation, repeated measurements, and repeated analysis can determine the narrow window 2002 for w-BN 504 composition. As shown in the phase diagram 500, the window for w-BN 504 composition is narrow as a combination of temperature 506 and pressure 508. Then, ultra-high-pressure, high-temperature operations that are executed can be conducted to focus on pressure and temperature conditions within the narrow window 502.

Figure 10B:
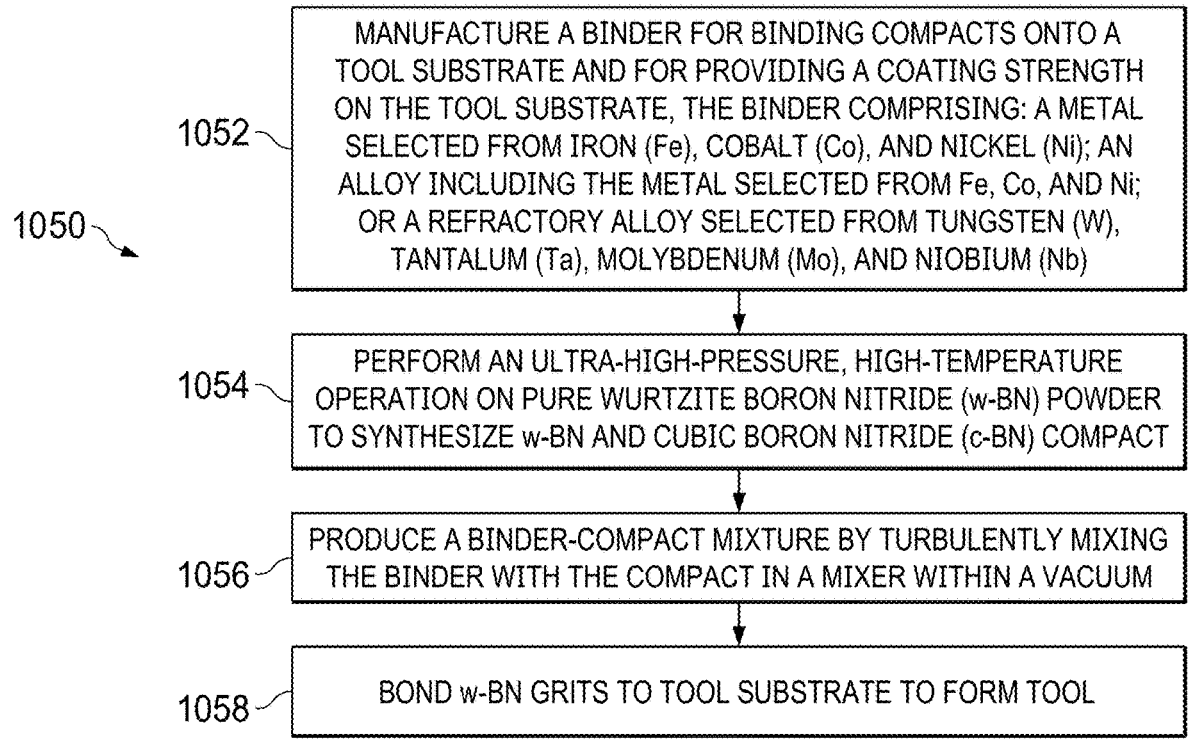
FIG. 10B is a flowchart of an example method for forming a tool for oil and gas applications using a synthesized w-BN and c-BN compact for bonding to a tool substrate.

FIG. 10B is a flowchart of an example method 1050 for forming a tool for oil and gas applications using a synthesized w-BN and cubic boron nitride (c-BN) compact bonded to a tool substrate, according to some implementations of the present disclosure. For clarity of presentation, the description that follows generally describes method 1050 in the context of the other figures in this description. However, it will be understood that method 1050 can be performed, for example, by any suitable system, environment, software, and hardware, or a combination of systems, environments, software, and hardware, as appropriate. In some implementations, various steps of method 1050 can be run in parallel, in combination, in loops, or in any order.

At 1052, a binder is manufactured for binding a cut compact onto a tool substrate and providing a coating strength on the tool substrate. In some implementations, the binder can include, for example, a metal selected from iron (Fe), cobalt (Co), and nickel (Ni); an alloy including the metal selected from Fe, Co, and Ni; or a refractory alloy selected from tungsten (W), tantalum (Ta), molybdenum (Mo), and niobium (Nb).

In some implementations, the compact has a first size greater than particles of the pure w-BN powder. The ultra-high-pressure, high-temperature operation can include, for example, pressurizing the pure w-BN powder to a pressure of approximately 20 gigapascals; heating the pure w-BN powder at a heating rate of 100° C./minute; and cooling the pure w-BN powder at a cooling rate of 50° C./minute. From 1052, method 1050 proceeds to 1054.

At 1054, an ultra-high-pressure, high-temperature operation is performed on pure wurtzite boron nitride (w-BN) powder to synthesize w-BN and cubic boron nitride (c-BN) compact. As an example, the apparatus 300 can be used to synthesize w-BN grits from pure w-BN powder. From 1054, method 1050 proceeds to 1056.

At 1056, a binder-compact mixture is produced by turbulently mixing the binder with the compact in a mixer within a vacuum. For example, the mixer 900 can be used to mix w-BN grits with an additive that is added through the active binder feed 808. From 1056, method 1050 proceeds to 1058.

At 1058, the w-BN grits (with binder) are bonded to a tool substrate to form the tool. The w-BN grits can be metallurgically bonded to the tool substrate, mechanically bonded to the tool substrate, or both metallurgically and mechanically bonded to the tool substrate at 1058. For example, one or more w-BN grits can be metallurgically bonded to the tool substrate at 1058. For example, one or more w-BN grits can be mechanically bonded to the tool substrate at 1058. For example, one or more w-BN grits can be metallurgically and mechanically bonded to the tool substrate at 1058. In some implementations, bonding the w-BN grits to the tool substrate includes inserting the w-BN grits within recesses formed in the tool substrate. In some implementations, bonding the w-BN grits to the tool substrate includes heating the tool substrate, which includes the inserted w-BN grits. In some implementations, the tool substrate (including the w-BN grits) is heated to a temperature in a range of from 200° C. to 300° C. In some implementations, the tool substrate (including the w-BN grits) is heated at a heating rate in a range of from 5° C./minute to 10° C./minute. In some implementations, bonding the w-BN grits to the tool substrate includes cooling the tool substrate after heating the tool substrate. In some implementations, the tool substrate (including the w-BN grits) is cooled at a cooling rate in a range of from 10° C./minute to 20° C./min.

In some implementations, method 1050 includes cutting the compact to a second size smaller than the first size using laser cutting tools. Cutting the compact (for example, using multiple cuts) can result in an octahedron shape. During cutting, the compact can be cooled with a cooling liquid.

In some implementations, the cutting process can include identifying pieces of the compact having a size greater than a threshold size of a size range. In this example, the pieces can be re-cutting, using the laser cutting tools, the pieces of the compact greater in size than the threshold size.

Figure 11:
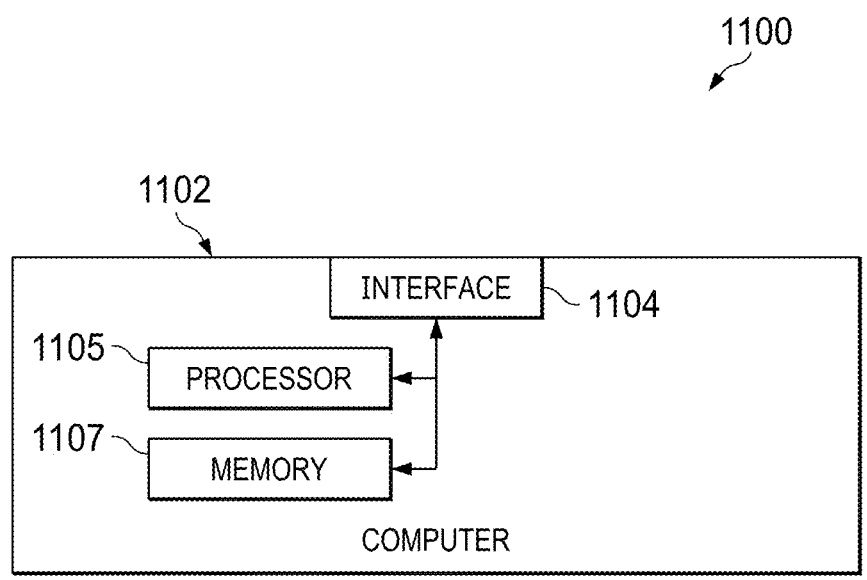
FIG. 11 is a block diagram illustrating an example computer system used to provide computational functionalities associated with described algorithms, methods, functions, processes, flows, and procedures as described in the present disclosure.

FIG. 11 is a block diagram of an example computer system 1100 used to provide computational functionalities associated with described algorithms, methods, functions, processes, flows, and procedures described in the present disclosure, according to some implementations of the present disclosure. The illustrated computer 1102 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 1102 can include input devices such as keypads, keyboards, and touchscreens that can accept user information. Also, the computer 1102 can include output devices that can convey information associated with the operation of the computer 1102. The information can include digital data, visual data, audio information, or a combination of information. The information can be presented in a graphical user interface (UI or GUI).

The computer 1102 can serve in a role as a client, a network component, a server, a database, a persistency, or components of a computer system for performing the subject matter described in the present disclosure. In some implementations, the computer 1102 is communicably coupled with a network. In some implementations, one or more components of the computer 1102 can be configured to operate within different environments, including cloud-computing-based environments, local environments, global environments, and combinations of environments.

The computer 1102 includes an interface 1104. Although illustrated as a single interface 1104 in FIG. 11, two or more interfaces 1104 can be used according to particular needs, desires, or particular implementations of the computer 1102 and the described functionality. The interface 1104 can be used by the computer 1102 for communicating with other systems that are connected to the network 1130 (whether illustrated or not) in a distributed environment. Generally, the interface 1104 can include, or be implemented using, logic encoded in software or hardware (or a combination of software and hardware) operable to communicate with the network. More specifically, the interface 1104 can include software supporting one or more communication protocols associated with communications. As such, the network or the interface's hardware can be operable to communicate physical signals within and outside of the illustrated computer 1102.

The computer 1102 includes a processor 1105. Although illustrated as a single processor 1105 in FIG. 11, two or more processors 1105 can be used according to particular needs, desires, or particular implementations of the computer 1102 and the described functionality. Generally, the processor 1105 can execute instructions and can manipulate data to perform the operations of the computer 1102, including operations using algorithms, methods, functions, processes, flows, and procedures as described in the present disclosure.

The computer 1102 also includes a memory 1107 that can hold data for the computer 1102 or a combination of components connected to the network 1130 (whether illustrated or not). Memory 1107 can store any data consistent with the present disclosure. In some implementations, memory 1107 can be a combination of two or more different types of memory (for example, a combination of semiconductor and magnetic storage) according to particular needs, desires, or particular implementations of the computer 1102 and the described functionality. Although illustrated as a single memory 1107 in FIG. 11, two or more memories 1107 (of the same, different, or combination of types) can be used according to particular needs, desires, or particular implementations of the computer 1102 and the described functionality. While memory 1107 is illustrated as an internal component of the computer 1102, in alternative implementations, memory 1107 can be external to the computer 1102.

There can be any number of computers 1102 associated with, or external to, a computer system containing computer 1102, with each computer 1102 communicating over the network. Further, the terms "client," "user," and other appropriate terminology can be used interchangeably, as appropriate, without departing from the scope of the present disclosure. Moreover, the present disclosure contemplates that many users can use one computer 1102 and one user can use multiple computers 1102.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method to form a tool for oil and gas application, the method comprising:
performing an ultra-high-pressure, high-temperature operation on pure wurtzite boron nitride (w-BN) powder to synthesize a BN compact comprising w-BN and cubic boron nitride (c-BN), wherein the BN compact has a first size greater than particles of the pure w-BN powder, and wherein the ultra-high-pressure, high-temperature operation comprises:
pressurizing the w-BN powder to a pressure of approximately 20 gigapascals, forming pressurized powder;
heating the pressurized powder at a heating rate of 100° C./minute, forming the BN compact; and
cooling the BN compact at a cooling rate of 50° C./minute;
cutting the BN compact into a plurality of cut compacts having a second size smaller than the first size using laser cutting tools;
inserting the plurality of cut compacts within a respective plurality of recesses formed in a tool substrate;
heating the tool substrate with the plurality of inserted cut compacts; and
after heating the tool substrate, cooling the tool substrate with the plurality of inserted cut compacts to form the tool, wherein heating the tool substrate comprises heating the tool substrate to a temperature in a range of from 200° C. to 300° C. at a heating rate in a range of from 5° C./minute to 10° C./minute.

2. The method of claim 1, comprising mixing the plurality of cut compacts with an additive comprising at least one binder for binding the plurality of cut compacts metallurgically onto the tool substrate, mechanically onto the tool substrate, or both metallurgically and mechanically onto the substrate.

3. The method of claim 1, comprising:
identifying one or more of the plurality of cut compacts having a size greater than a threshold size of a size range; and
re-cutting, using the laser cutting tools, the one or more of the plurality of cut compacts having the size greater than the threshold size.

4. The method of claim 3, wherein identifying the one or more of the plurality of cut compacts having the size greater than the threshold size includes using a laser scanner to measure the plurality of cut compacts.

5. The method of claim 1, comprising cooling the compact with a cooling liquid during a cutting process that includes the cutting.

6. The method of claim 1, comprising:
determining a pressure and temperature window at which the ultra-high-pressure, high-temperature operation forms the compact; and
executing the ultra-high-pressure, high-temperature operation within the pressure and temperature window.

7. The method of claim 1, wherein the BN compact has an octahedron shape.

* * * * *